July 14, 1942.  J. LINHARES  2,289,663

FISHING HOOK FLOAT

Filed Aug. 26, 1941

Inventor
Joseph Linhares.

By Clarence A. O'Brien

Attorney

Patented July 14, 1942

2,289,663

UNITED STATES PATENT OFFICE 2,289,663

FISHING HOOK FLOAT

Joseph Linhares, Oakland, Calif.

Application August 26, 1941, Serial No. 408,386

2 Claims. (Cl. 43—27)

This invention relates to a fishing hook float, the general object of the invention being to provide a float connected to a part of the fishing line adjacent the weight at the lower end of the line so that the float will be held under water and adjacent the bottom of the body of water with arms carried by the float and having the leaders of fish hooks connected therewith so that the hooks are held a distance from the bottom of the body of water so that the hooks will not be caught in grass, sea weeds and the like growing on the bottom and also crabs will be prevented from reaching the bait on the hooks.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figures 1, 2:
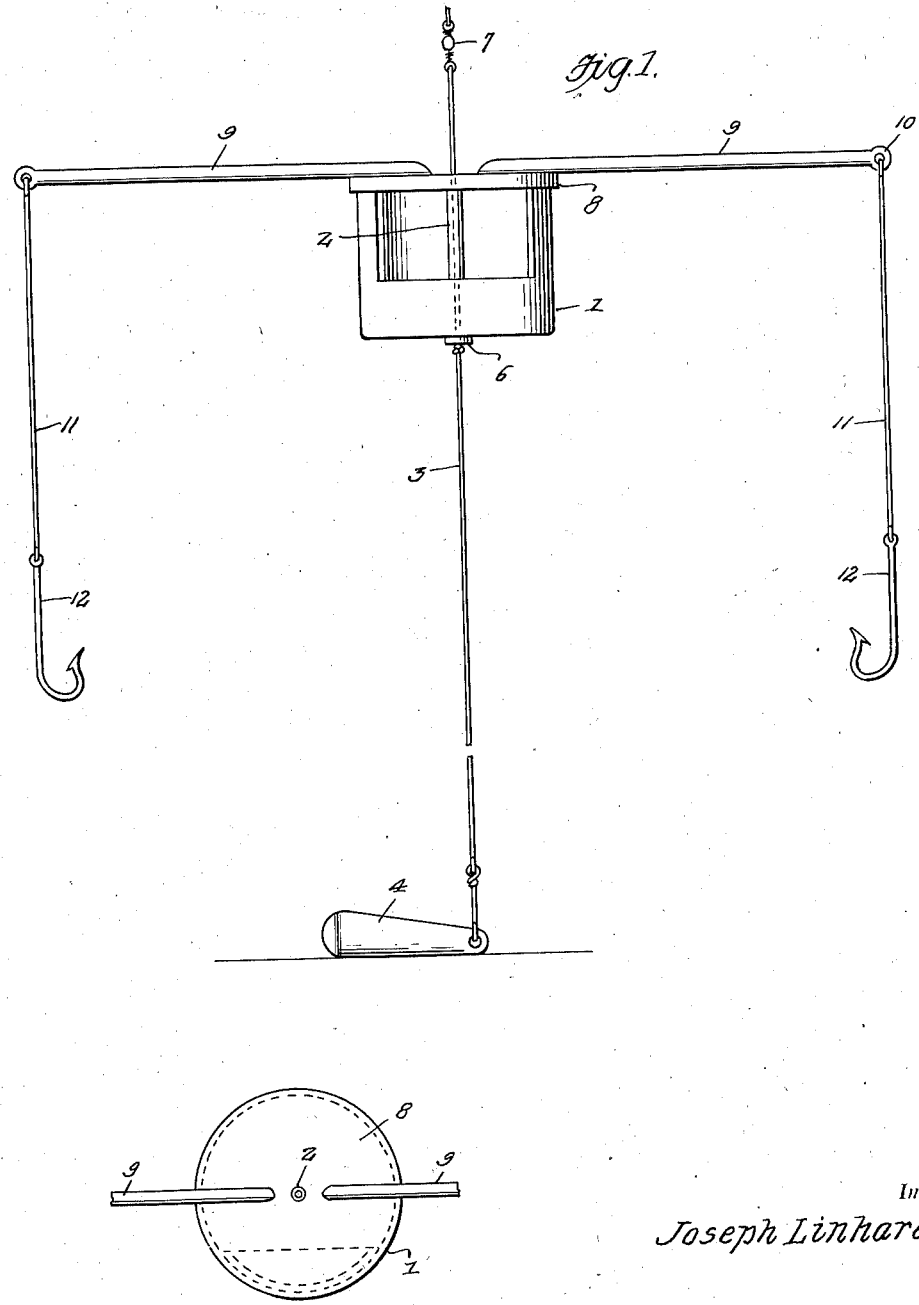
Figure 1 is an elevational view of the invention.
Figure 2 is a top plan view.

In these views the numeral 1 indicates the float which has a tubular part 2 passing vertically therethrough and the fish line 3 passes through this tubular part and has a weight 4 at its lower end. A stop member 6 is connected to the line under the float so that when the line is pulled from the water this stop will strike the float and cause the float to pass up through the water with the line. That part of the line carrying the float has a swivel 7 at its upper end to which the balance of the line is connected and this swivel prevents the line with the float thereon from whirling about in the water. The float is provided with a cover 8 to which oppositely extending arms 9 are connected, these arms extending horizontally and having eyes 10 at their outer ends for receiving the upper ends of leaders 11 for the fish hooks 12.

Thus it will be seen that I have provided means for holding the fish hooks off the bottom of the body of water so that these hooks are not likely to become entangled in sea weed, grasses and the like and it will be very difficult for the crabs to reach the bait on the hooks.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a fishing device including a short length of line adapted for attaching to the lower end of a fish line and having a sinker on its lower end, a float freely mounted on the short line and above the sinker, said line having means at its upper end limiting its upward movement, arms extending outwardly from the top of the float, and hook carrying leaders connected with the outer ends of the arms.

2. In a fishing device, a short length of line having a swivel at its upper end adapted to be connected to a main part of the line, a sinker on the lower end of the short length, a float having a tube passing therethrough and through which the upper portion of the short length of line passes, an arm connected with the top of the float and extending outwardly therefrom, and a hook carrying leader connected to the outer end of the arm.

JOSEPH LINHARES.